(12) United States Patent
Chow et al.

(10) Patent No.: US 6,574,022 B2
(45) Date of Patent: Jun. 3, 2003

(54) INTEGRAL DIFFERENTIAL OPTICAL SIGNAL RECEIVER

(75) Inventors: Alan Y. Chow, 191 Palamino Pl., Wheaton, IL (US) 60187; Vincent Y. Chow, Hanover Park, IL (US)

(73) Assignee: Alan Y. Chow, Wheaton, IL (US)

( * ) Notice: Subject to any disclaimer, the term of this patent is extended or adjusted under 35 U.S.C. 154(b) by 32 days.

(21) Appl. No.: 09/812,214

(22) Filed: Mar. 19, 2001

(65) Prior Publication Data

US 2002/0131135 A1 Sep. 19, 2002

(51) Int. Cl.[7] .......................... H04B 10/00; H04B 10/06
(52) U.S. Cl. .......................... 359/189; 385/83; 385/14; 385/50; 359/191; 359/195
(58) Field of Search ................... 359/189–195; 385/83, 14, 50; 250/227.12, 208.2

(56) References Cited

U.S. PATENT DOCUMENTS

| | | | |
|---|---|---|---|
| 4,001,867 A | | 1/1977 | Kravitz et al. |
| 4,292,628 A | * | 9/1981 | Sadler .......................... 250/551 |
| 4,821,338 A | * | 4/1989 | Naruse et al. .......... 250/214 B |
| 4,873,448 A | | 10/1989 | Shirai |
| 4,991,920 A | * | 2/1991 | Peczalski ..................... 341/137 |
| 5,001,336 A | * | 3/1991 | de la Chapelle ......... 250/208.2 |
| 5,105,293 A | * | 4/1992 | Bortolini ..................... 359/154 |
| 5,130,528 A | | 7/1992 | Phillips, Jr. |
| 5,130,776 A | | 7/1992 | Popovic et al. |
| 5,189,296 A | * | 2/1993 | Kwark ..................... 250/208.2 |
| 5,223,728 A | | 6/1993 | Gempe |
| 5,256,882 A | | 10/1993 | Miyasaka |
| 5,331,452 A | * | 7/1994 | Smyth et al. .......... 250/227.14 |
| 5,338,991 A | | 8/1994 | Lu |
| 5,351,309 A | | 9/1994 | Lee et al. |
| 5,491,349 A | | 2/1996 | Komoto et al. |
| 5,717,201 A | | 2/1998 | Lin et al. |
| 5,880,461 A | * | 3/1999 | Spear ....................... 250/208.2 |
| 5,991,062 A | * | 11/1999 | Fischer et al. .............. 359/190 |
| 6,064,507 A | * | 5/2000 | Heflinger et al. ........ 250/214 A |
| 6,266,173 B1 | * | 7/2001 | Hayes ......................... 359/119 |
| 6,359,716 B1 | * | 3/2002 | Taylor ......................... 359/189 |

FOREIGN PATENT DOCUMENTS

| | | |
|---|---|---|
| EP | 0084621 | 11/1982 |
| EP | 0501904 | 2/1992 |
| EP | 9639221 | 12/1996 |

OTHER PUBLICATIONS

The Vertical Integration of Crystalline NMOS and Amorphous Orientational Edge Detector, Heng–Chin Lin, Wen–Jyh Sah, and Si–Chen Lee (Dec. 12, 1992) vol. 39, No. 12, pp. 2810–2812.

* cited by examiner

Primary Examiner—Jason Chan
Assistant Examiner—Agustin Bello
(74) Attorney, Agent, or Firm—Mayer, Brown, Rowe & Maw

(57) ABSTRACT

An optical signal receiver for rapid and error free translation of optical signals into electrical signals is disclosed. The receiver is coupled to a light source. The light source is amplified and then split into two segments. One of the segments is delayed by a specific amount of time. Both segments are optically coupled to a photo detector. Each photo detector is coupled in parallel and are connected by two output terminals. When the voltage output by each photo detector is equal, the output terminals are balanced and will not have any voltage. The circuit will provide a voltage output on the terminal only on differential photocurrents sensed by the detector elements. The quiescent magnitude of the voltage output is a function of the value of the reverse bias voltage applied by the two voltage sources.

31 Claims, 7 Drawing Sheets

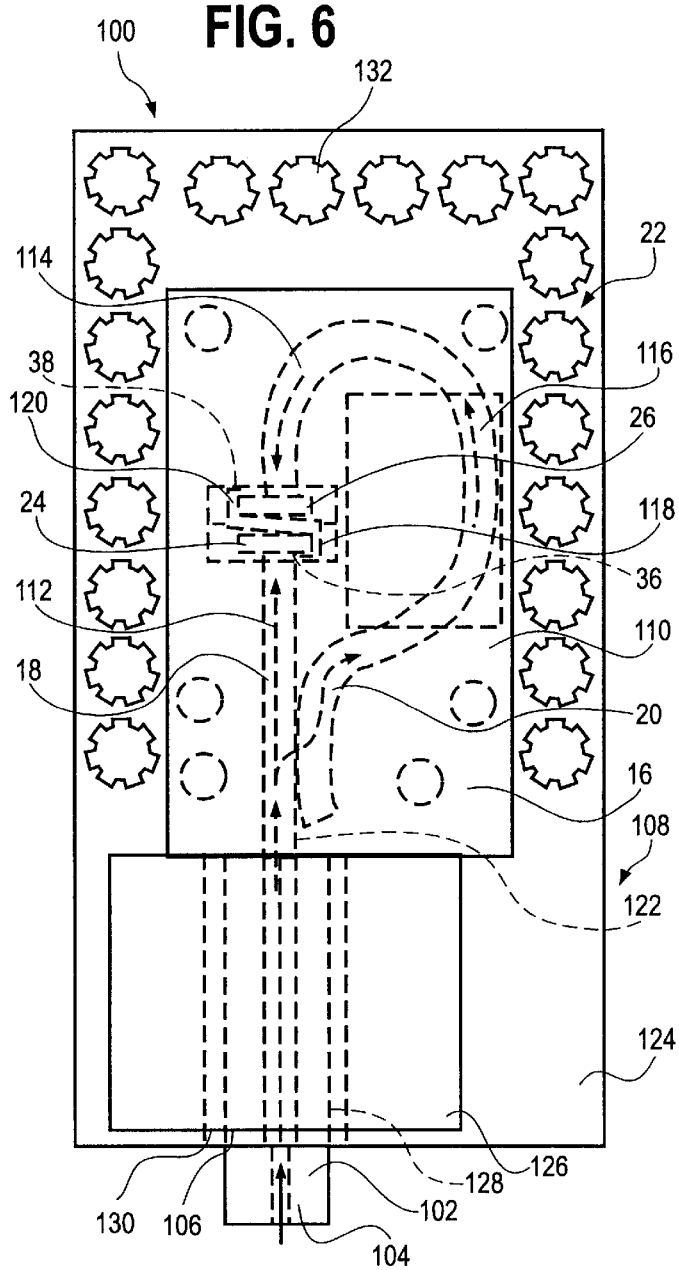
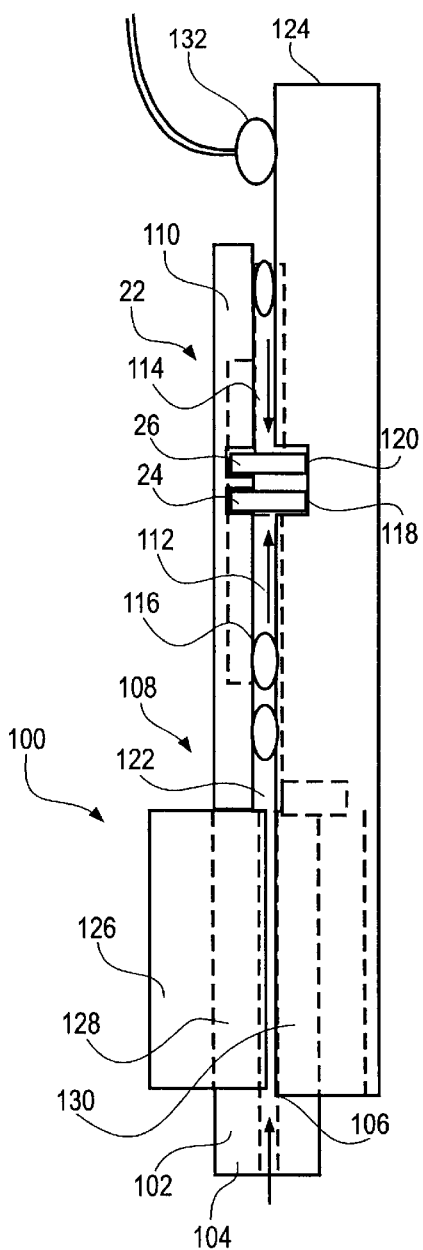
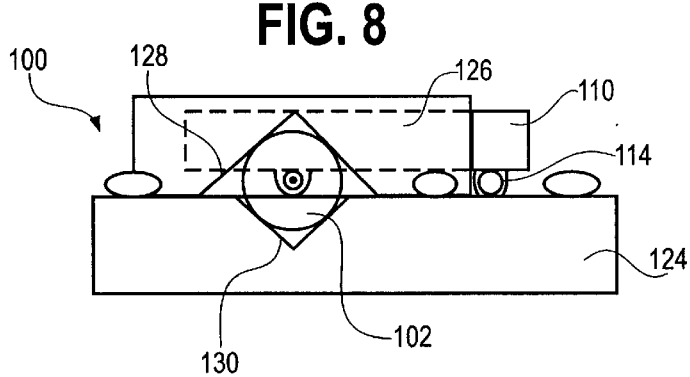

US 6,574,022 B2

INTEGRAL DIFFERENTIAL OPTICAL SIGNAL RECEIVER

FIELD OF INVENTION

This invention relates to a high sensitivity optical signal receiver. More particularly, the invention relates to a method and system for receiving and converting optical signals with a high signal to noise ratio.

BACKGROUND OF INVENTION

Optical receivers are used in fiber optical networks such as those for telecommunication networks in order to detect light signals. All optical receivers currently function as a single-ended threshold optical signal detector which uses a photo detector and a DC reference to produce a digital signal in response to an optical input signal. Input light pulses are sensed by a single photodetector that converts light energy into an electrical current. The current pulse is then sensed by either a transimpedance or high-impedance amplifier and converted into a voltage signal. The output of the amplifier is further filtered electrically into an output signal which enters a voltage comparator for logic level conversion.

The output of the comparator is a digital bit equivalent to the bit data represented by the input light signal. A comparator logic ONE output value equates to the presence of a light pulse while a logic ZERO equates to the absence of a light pulse. The output of the comparator represents the separation point between analog processing for the comparator input and digital processing of the output.

A typical optical telecommunications link consists of a transmitter light source, an optical fiber span, interconnecting optical elements and the receiver. The success of the receiver to determine the presence of light pulse depends on the available signal-to-noise ratio. In an optical transmission system, there are many variables that distort and contaminate light signals traveling in the fiber as well as noise levels at the receiver. Common optical signal degradation factors are laser output power limitations, fiber attenuations, splitter losses, excess termination losses, laser extinction ratio, in-line optical amplifier gain and detector quantum efficiency. Factors that will increase the noise factor are dark current noise, amplified spontaneous emission noise, crosstalk noise, modal noise, phase noise, laser noise, Johnson thermal noise, shot noise and electronic amplifier noise. In particular, Johnson thermal noise, shot noise and electronic amplifier noise are of the most concern for optical receivers.

Typically PiN photodiodes in conjunction with a load resistor are used for optical receivers because they are the only electrical circuit stable enough to run at multi-gigabit rates. The load resistor functions to quickly discharge the photodiode after the detection of a light pulse. However at high frequencies above 1 Ghz, Johnson noise from the load resistor is predominant. This noise may be 1,000 times higher than amplifier electronics noise and 10,000 times higher than shot noise. The load resistor value must be low to achieve a high bandwidth by having a short RC time constant which is governed by the resistor value and the internal photodiode capacitance. As the RC value decreases, the bandwidth of operation will increase. However, a low resistor value also generates higher Johnson noise resulting in a tradeoff between noise and discharge time.

Signal levels are always positive in polarity with respect to signal ground in optical signal detection. This method of detection is highly efficient when signal levels are strong since a signal pulse can easily be discerned using a DC threshold reference level that is substantially above background noise. The DC threshold reference level is ideally set at the mid-point between detection probability functions for a ONE and a ZERO. With weaker signals, setting the DC threshold level becomes increasingly difficult. This problem may be minimized by using automatic gain control or AGC. However, AGC requires an error signal before a correction shift may be made. The elapsed time between a transient error and the AGC response is a major limiting factor as a fast AGC response leads to instability problems while a slow AGC response limits its effectiveness.

To address these shortcomings, an approach to optical telecommunications transmission technology, that was patterned after superheterodyne radio receivers. This optical format required special modulation of the transmitted signal that altered either the amplitude, phase, frequency or polarization of the carrier light frequency. Data was not transmitted as simple on and off pulses but as continuous light. At the receiver, a strong monochromatic local laser at a specific wavelength is mixed with the weak input signal to produce an intermediate or IF frequency similar to a radio receiver. The IF frequency is then processed through IF filters to demodulate the encoded information into an amplitude signal. It finally enters a threshold circuit that converts the signal back to the original ONE and ZERO data stream. This method of data extraction is commonly known in linear circuits as phase lock loop demodulation. To accomplish the mixing in the optical domain, an evanescent coupler is used to mix the two signals (the local oscillator and the input light signal) to form two copies of the signal. Each copy of the light signal is sensed by separate photodiodes connected in a balanced detector arrangement that parallels a "Wheatonbridge" circuit. The teaching from this balanced detector arrangement was limited to common mode cancellation of local oscillator noise (laser spontaneous emission noise). Coherent detection has been replaced by simple direct-detection because of its complexity and incompatibility with dense wavelength division multiplexing ("DWDM") solutions.

Thus, a need exists for an optical receiver which allows high bandwidth without significant delays due to high resistance. There is a further need for an optical receiver which allows both differentiation and integration of an optical signal conversion. There is also a need for an optical receiver with an efficient signal to noise ratio. There is also a need for an optical receiver with common mode rejection to allow improved dynamic range. There is additionally a need for an optical receiver which may be integrated with other processing electronics. There is also a need for an optical receiver which allows flexibility in components for biasing the electrical output.

SUMMARY OF THE INVENTION

These needs may be addressed by the present invention which is embodied in an optical signal receiver for reception of an optical signal and conversion of that signal to an electrical signal. The receiver has an optical amplifier capable of receiving the optical signal. An optical splitter is optically coupled to the optical amplifier and has two optical outputs. An optical sensor is coupled to the optical splitter and has a first output terminal and a second output terminal. A first photo detector which produces an electrical signal in response to a light input is coupled between the first and second output terminals. The first photo detector element is exposed to the first output of the optical splitter. A second photo detector which produces an electrical signal in response to a light input is coupled between the first and second output terminals and in parallel with the first photo detector. The second photo detector element is exposed to the second output of the optical amplifier. The signal from the second output of the optical splitter is delayed relative to the signal from the first output.

The invention may also be embodied in a method of receiving an optical signal and converting the signal to an electrical signal. The light signal is amplified and then split into a first and second segment. The first segment is delayed and the first segment of the light signal and the second segment of the light signal are converted into electrical signals. The electrical signals are compared to generate an electrical signal representative of the optical signal.

The invention may also be embodied in an optical receiver for converting an amplified optical signal on an optical fiber to an electrical signal. The receiver has an optical connector connected to the optical fiber and a passive substrate. An active substrate is mounted on the passive substrate. A splitter is fabricated on the active substrate and coupled to the optical connector, the splitter has two outputs for splitting the optical signal. A first and second waveguide are coupled to the two outputs of the splitter respectively, the first waveguide being longer than the second waveguide. A first photo detector is optically coupled to the first waveguide and has an anode and a cathode. A second photo detector is optically coupled to the second waveguide and has a cathode coupled to the anode of the first photo detector and an anode coupled to the cathode of the first photo detector. An output node is coupled to the anode of the first photo detector and the cathode of the second photo detector.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

FIG. 6 is a top view of a fabrication assembly using an active substrate for the optical receiver in FIG. 1;

FIG. 7 is a side view of the fabrication assembly in FIG. 6;

FIG. 8 is a cross section view of the fabrication assembly taken along the line 8—8' in FIG. 6;

DESCRIPTION OF THE PREFERRED EMBODIMENT

Figure 1:
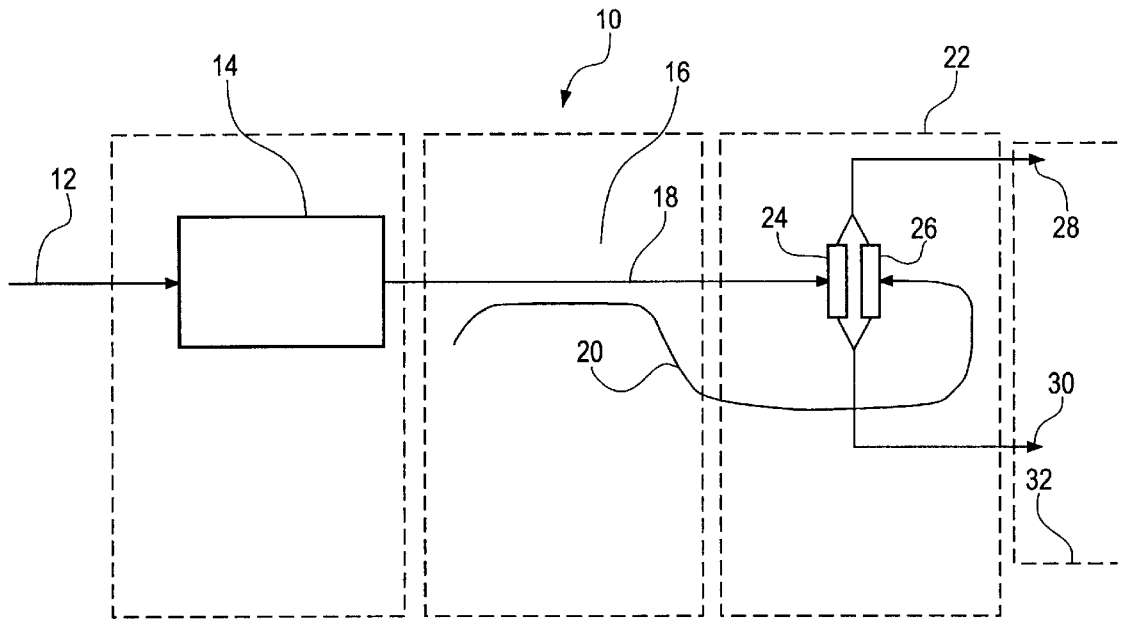
FIG. 1 is a block diagram of an optical receiver according to one embodiment of the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIG. 1 shows an integral-differential sensor optical receiver 10 which receives a signal from an input light source 12. The input light source 12 is a fiber optic cable in this example but may be from the output of a DWDM demultiplexer or the final output stage of a multi-link long haul span. The input light signal from the input light source 12 is first amplified by an optical amplifier 14. The optical amplifier 14 in this example is an Erbium Doped Fiber Amplifier (EDFA) but may be any suitable optical amplifier. The optical signal from the optical amplifier 14 is then coupled into an evanescent fiber splitter 16. The fiber splitter 16 has a first output 18 and a second output 20. The light signal is divided by the splitter 16 between the outputs 18 and 20. The second delayed output 20 is designed to have a longer optical path length as compared to the first output 18 and thus delays that light signal. The two light segments from the outputs 18 and 20 are input to a photo detector unit 22. The photo detector unit 22 has a first photo detector which is a photodiode 24 which senses the light from the output 18 and a second photo detector which is a photodiode 26 which senses the light from the delayed output 20. The photo detector unit 22 has two electrical output nodes 28 and 30 which are coupled to the photodiodes 24 and 26. The signal output of the receiver 10 is generated across the two output nodes 28 and 30 and are electrically connected to preamplifier electronics 32 for further signal processing.

Figure 2:
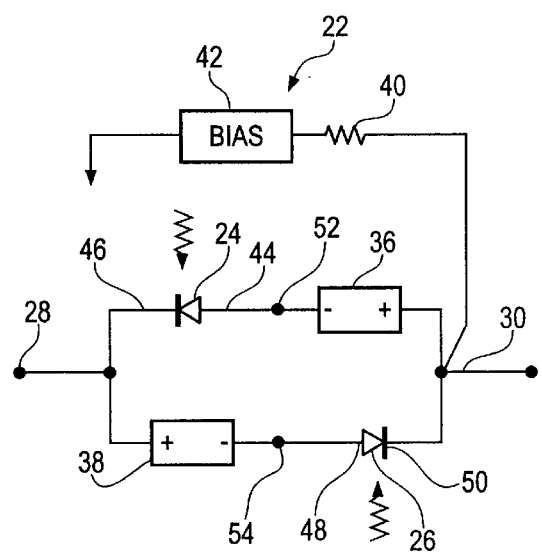
FIG. 2 is a block diagram of the photo detector unit of the optical receiver in FIG. 1.

FIG. 2 is a block diagram of the photo detector unit 22 in FIG. 1. The photodiodes 24 and 26 are PiN photodiodes in this example, but may also be Indium-Gallium-Arsenide (InGaAs) or any Ill-V compound material detector. The photo detector unit 22 also has two floating DC power supplies 36 and 38 and a bias resistor 40 connected to a DC bias potential source 42. Both of the photodiodes 24 and 26 operate in the reverse bias mode.

The first photodiode 24 has an anode 44 and a cathode 46. Similarly, the second photodiode 26 has an anode 48 and a cathode 50. The anode 44 of the first photodiode 24 is serially connected to the negative side of the first floating DC reverse bias power supply 36. The anode 48 of the second photodiode 26 is similarly connected to the negative side of a second floating DC reverse bias power supply 38. The cathode 46 of the photodiode 24 is connected to the positive side of bias power supply 38 to form the output node 28. The cathode 50 of the photodiode 24 is connected to the positive side of bias power supply 36 to form the output node 30.

As may be realized, the photodiodes 22 and 24 and the bias sources 36 and 38 of the optical sensor unit 22 form a complete electrical floating closed loop circuit. Any point in this circuit loop can be used as a return or signal ground reference to any other node in the same circuit. A series of four nodes 28, 30, 52 and 54 may be connected in the circuit loop. As an optical receiver, either the node 28 or node 54 is used as the circuit ground reference point. If the node 28 is grounded, then the node 30 becomes the output signal. The bias point of operation for the node 30 is set by a high value resistor for the resistor 40 connected between the node 30 and the desired bias voltage of voltage source 42. For 0 volt bias operation, the bias voltage is simply set to 0 volts, effectively grounding the resistor 40 to the same ground point as the node 28.

This first node arrangement is preferred when using a high impedance amplifier in single mode (signals always greater or equal to 0 volts) operation or when using a transimpedance amplifier in tristate (signals can go positive or negative) detection. For positive bias operation, the bias voltage of the voltage source 42 may be set to a positive voltage level such as 5 volts DC. This positive bias operation is preferred when signals must always be above 0 volts for high impedance or transimpedance amplification. The choice in bias voltage is determined by the end application and the interface to other logic circuits. The floating characteristics of the photo detector unit 22 permits this flexibility.

The receiver 10 is capable of integrating and differentiating the input signal. The integral function of the receiver 10 is derived inherently from the parasitic capacitance of the PiN photodiodes 24 and 26. The differential function is derived from the common mode property of the photodiodes 24 and 26. The voltage-phase output from the output nodes 28 and 30 is therefore a combination of integration and differentiation. The integration mode is dominant whenever one side of the optical signal on the photodiodes 24 and 26 is stronger than the other. This initiates a charge or discharge action on the output node or sense node 30. Since the sense node 30 is dominated by pure capacitance (the load resistor value is very high), the resultant node voltage will rise or fall linearly under steady state input currents of like polarity. If equal light intensities were present on the photodiodes 24 and 26, the sense node 30 is operating in the differential mode where current balance keeps the sense node voltage unchanged. This is similar to the "hold" function of a sample-and-hold memory cell. In the "hold" mode, only leakage currents can alter the sense node charge. The only leakage path on the sense node 30 is through the high value bias resistor 40 under a long time constant. This leakage has virtually no effect over short durations of 20 clock cycles.

Figure 3A:
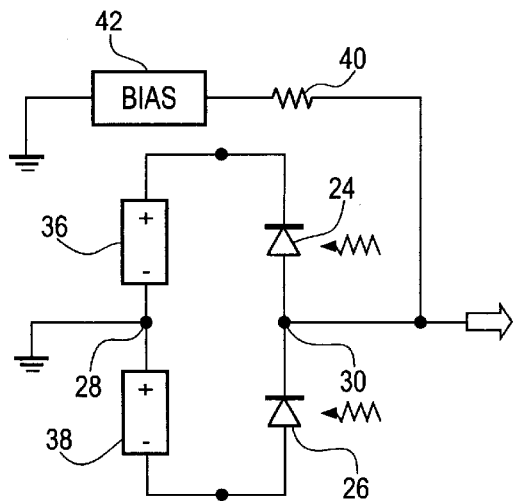
FIGS. 3A–3D are different variations of the photo detector unit in FIG. 2 for achieving balanced biphasic mode operation with a quiescent voltage equal to ground.
Figure 3B:
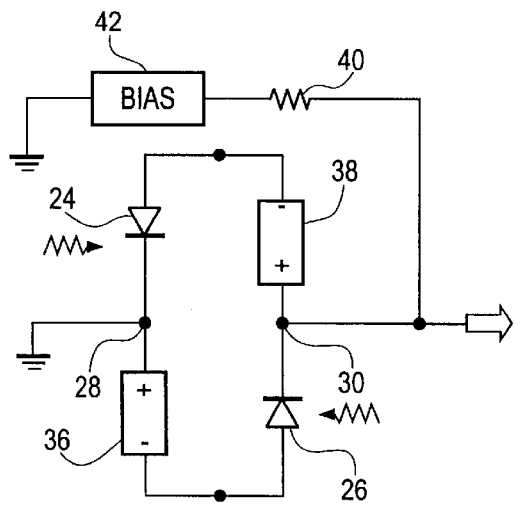
Figure 3C:
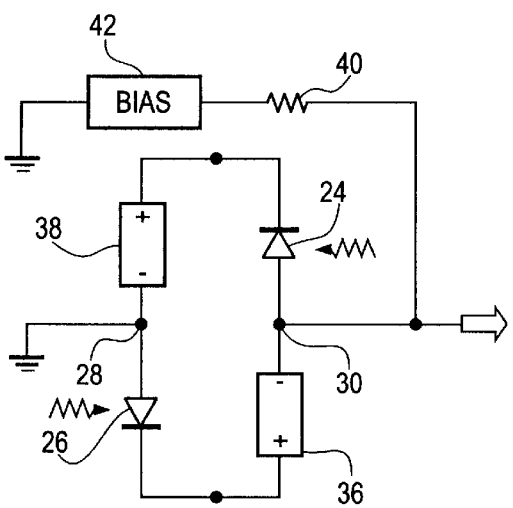
Figure 3D:
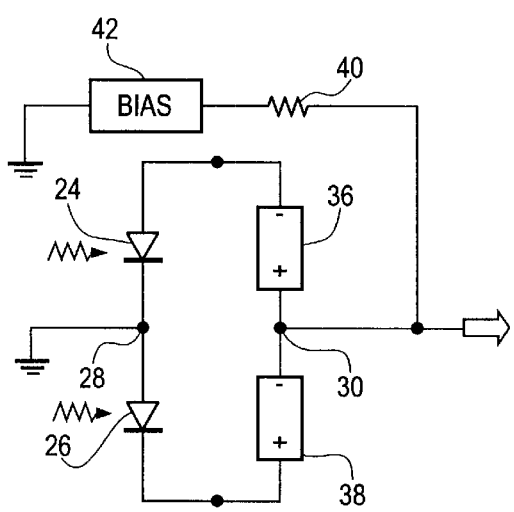

On each side of the circuit loop, the photodiodes 24 and 26 and respective power supplies 36 and 38 can be transposed in position (without rotation) and not affect the basic electrical loop function. For example, the components in FIG. 2 may be rearranged in FIGS. 3A–3D which use like element numbers as those in FIG. 2 without altering the functionality of the optical photo detector 22. In all of these variations, the node 28 is coupled to a ground reference. This orientation flexibility permits two loop arrangements in either a diode—diode-supply—supply arrangement as shown in FIGS. 3A and 3D or the diode-supply-diode-supply configurations shown in FIGS. 3B and 3C. Depending on the circuit application and fabrication layout factors, each arrangement will have its own merits. In the circuits shown in FIGS. 3A–3D, the output has identical function but the flexibility in component location permits efficient two dimensional or three dimensional layout options during fabrication and packaging. The configurations in FIGS. 3A–3D are biphasic circuits where the quiescent operating point is ground. The reverse bias supplies 36 and 38 in FIGS. 3A–3D will drop the voltages across the two photodiodes 24 and 26 relative to the bias voltage at the output node 30. If the two reverse bias supplies 36 and 38 are equal and set to 5V while the output bias supply 42 is set at 0V, then the two photodetectors will each see 5V of reverse bias. Up to a certain point, the speed dynamics of a photodiode is highly dependent on the reverse bias voltage used. For example, if the output bias was changed to +0.1V in FIG. 3A, the photodiode 24 will sense only 4.9V in reverse bias while the photodiode 26 will sense 5.1V in reverse bias. Small changes to the output bias voltage have no significant effect on the biphasic mode and the quiescent operating point. This ability to skew the reverse bias of both photodiodes slightly with one output bias voltage allows easy fine adjustments to photodiode response speeds. This is important for fine tuning two nearly matched photodiodes for optimal response in the receiver 10.

Figure 4A:
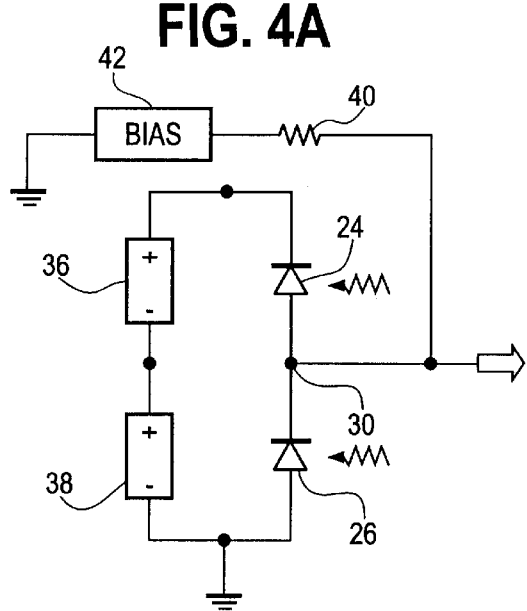
FIGS. 4A–4C are different variations of the photo detector unit in FIG. 2 for achieving unipolar mode operation with a quiescent voltage above ground.
Figure 4B:
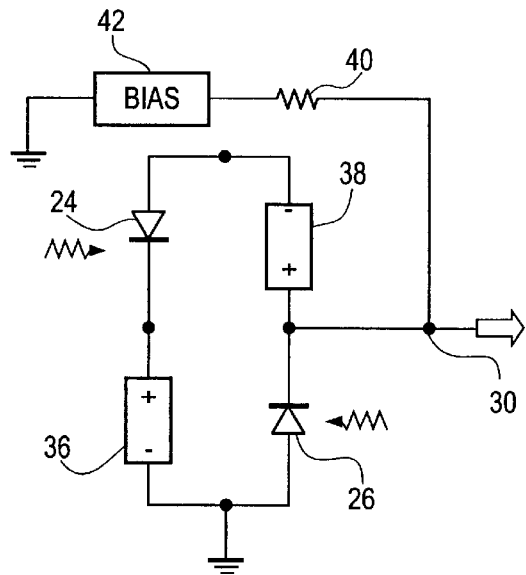
Figure 4C:
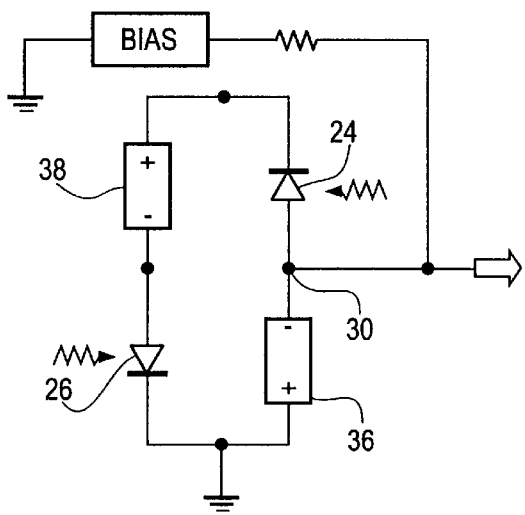

The same flexibility is true in positive bias operation of the optical detector unit 22. FIGS. 4A–4C show the diode—diode-supply—supply and diode-supply-diode-supply arrangements without altering sensor network function. In these configurations the voltage bias source 42 is set to a positive voltage to bias the output that is the same voltage as the reverse bias source. This permits the detector unit 22 to function in a single ended or monophasic configuration where the quiescent operating point is always above ground. Photodetector response speed is adjusted by the external output bias voltage identical to the biphasic circuit described earlier.

The DC bias supplies 36 and 38 are preferably special photovoltaic structures. The advantage of using photovoltaic elements for bias is small size and the control and isolation of parasitic impedances within the sensor loop. When multiple receivers are fabricated as a linear array, the bias requirements within each network can be satisfied by a common light source illuminating banks of isolated silicon carbide photodiode stacks serving as the bias supplies via a dedicated waveguide. Silicon carbide photodiodes are wide bandgap structures with high open circuit voltages ideal for use in the bias supply function. A stack of 3 silicon carbide structures can produce approximately 5V of bias for each side of the circuit loop. As is well known in the art, the 3C and 6C orientations of silicon carbide have bandgaps of 2.3 eV and 2.9 eV, respectively, compared to only 1.1 eV for silicon. A single photodiode junction in 6C material can produce 1.6 volts of open circuit voltage or almost 3 times that of silicon. Three SiC-6C photodiodes can be combined in series for over 4.8 volts. The hybrid flexibility of the substrate permits full integration of floating bias structures (using unique materials) into each detector of the photo detector unit 22. The floating capability (optical isolation) ensures high crosstalk rejection between different receivers such as the receiver 10 within an array. At the same time, receivers at multi-gigabit rates inside a dense wavelength division multiplexer ("DWDM") array can still share many electrical and optical resources.

The unique property of the reverse bias structure permit it to perform direct light to light comparisons and produce a direct electrical action output. The photocurrent generated by one photodiode can be precisely offset by photocurrent generated by the second photodiode in the optical detector unit 22. Under this balanced condition, the output node 30 of the optical detector unit 22 will be zero volts in output over a very wide range of illumination. When an imbalance occurs between the two photocurrents, the output node 30 is charged to a positive or negative polarity depending on the photodiode current polarity dominating. If illumination alternates equally between the two photodiodes 24 and 26, the output sense node 30 will show equal response speed for both signal buildup and signal decay. This characteristic permits active charging or discharging of the sense node 30 without dependence on charge bleeding by a load resistor. To set the operating point of this sense node, the high value bias resistor 40 is substituted for the load resistor of a known receiver. For ground reference operation, the bias resistor 40 is connected either to circuit ground or 0 volts.

The receiver 10 in FIG. 1 is based on the concept of using two copies of the input light signal from the splitter 16 to charge and discharge the sensing node 30. The raw input optical signal from the light source 12 is first amplified by the optical amplifier 14 to increase the signal amplitude by a magnitude of two or more. Application of a pre-gain stage is well understood in the art and is similar to the internal gain of an avalanche photodiode (APD) used to achieve higher receiver sensitivity. The APD gain of presently known receivers becomes a problem at ultra-high data rates above 10 gigabits because of recovery time tailing which limits data bandwidth.

The receiver 10 takes advantage of the preamplification of the amplifier 14 to maximize the signal-to-noise performance. Unlike an avalanche photodiode, the receiver 10 with the EDFA type amplifier 14 will have a much higher bandwidth because recovery time tailing is not present to limit performance. The receiver 10 can also tolerate much higher input signals (compared to single ended detectors) without encountering saturation and therefore can take advantage of higher signal gains possible by EDFA amplification. This is important when the receiver 10 is fabricated using planar waveguides where splitting will result in a 3 dB signal loss. By choosing the optimum EDFA gain for integration and differentiation operation, this 3 dB loss from splitting can be restored.

The amplified EDFA signal from the amplifier 14 is coupled into the evanescent coupler 16 to split the optical signal into two halves. Evanescent coupler technology is well known in the art. Commonly available Gould couplers and telecommunications switch fabrics all function on this principle. The physics of amplification in an EDFA permits optical signal amplification with a relatively low noise penalty of around −3 dB. The principle of this detection can be readily found in many text books such as Introduction to DWDM Technology by Stamatios V. Kartalopoulos (IEEE, 1999).

The operation of the receiver 10 may be explained with reference to FIG. 1. After the incoming signal is amplified by the amplifier 14 and split by the splitter 16 into two equal signals, the photodiode 24 will detect the non-delayed light pulse signal from the output 18. The second photodiode 26 will detect the delayed light pulse signal from the output 20. The first light pulse will charge the photodiode sense output nodes 28 and 30 to some maximum voltage potential. This voltage magnitude is governed by the capacitance value of the output nodes 28 and 30. The lower this capacitance, the higher will be the signal voltage. When the second light pulse reaches the photodiode 26 it produces an equal but opposite effect that discharges the voltage across the output nodes 28 and 30 back to ground.

Figure 5A:
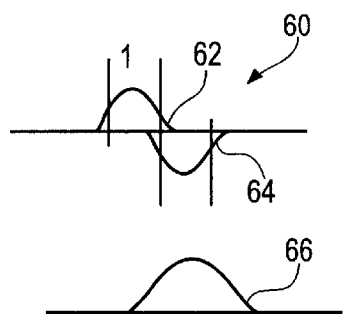
FIGS. 5A–5C are timing diagrams of the input and output signals of the receiver in FIG. 1

FIG. 5A shows a timing diagram 60 which has a trace 62 representing the first light signal from the output 18 in FIG. 1 and a second trace 64 representing the second light signal from the output 20. A second timing diagram 66 shows the voltage across the output nodes 28 and 30. As may be seen by the timing diagram 66, the second light signal causes the output voltage to discharge. This charge/discharge cycle will occur within one bit time and unlike conventional optical signal receivers is not affected by the strength of the input signal. This discharge point is very important.

Figure 5B:
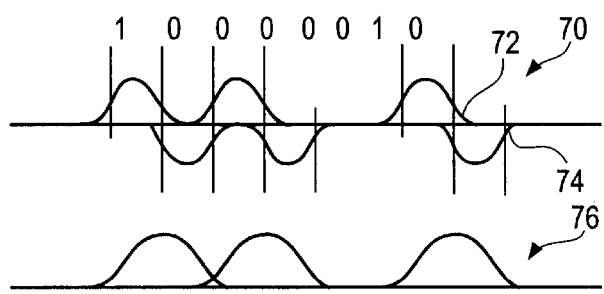
Figure 5C:
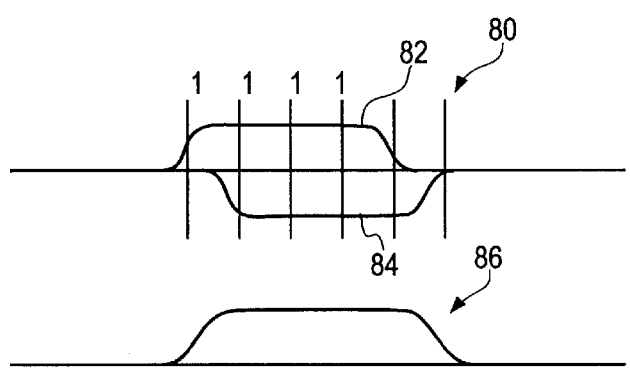

The active charge scheme works equally well with any input data pattern. For example, FIG. 5B shows a timing diagram 70 which has a trace 72 representing the first light signal from the output 18 and a second trace 74 representing the second light signal from the output 20 of a series of ONE and ZERO bits. A second timing diagram 76 shows the voltage across the output nodes 28 and 30. A timing diagram 80 for multiple high or ONE bits is shown in FIG. 5C. A first trace 82 represents the input light signal to the first photodiode 24 while a second trace 84 represents the delayed input light signal to the second photodiode 26. A timing diagram 86 for the voltage across the output nodes 28 and 30 shows that the output nodes 28 and 30 are fully charged after the first bit and will hold that state because the discharge event is naturally inhibited until the last bit is transmitted. This occurs because after the first ONE bit, the optical detector unit 22 is in balance and discharge is withheld. Only at the last bit will imbalance return to permit active discharge of the output nodes 28 and 30.

With active discharge, the receiver 10 eliminates the normal load resistor of a standard single ended threshold optical signal detector and replaces it with a high value bias resistor such as the resistor 40. With this high value bias resistor 40, the magnitude of the signal voltages can be greatly increased. This advantage permits the use of voltage detection or current sensing of the sense node state as discussed below. This choice was not possible in single ended receivers because the magnitudes of the voltages at the sense node in the presence of a load resistor is so low that it made voltage detection impractical. The bias resistor 40 also performs a slow discharge function of the sense node 30. This ensures the sense node 30 is always very close to the desired bias voltage point.

The charge/discharge sequences described applies to single one bits and multiple one bits. The light pulses can be in RZ (Return to Zero) or NRZ (Non-Return to Zero) formats. The delay length used for the light pulse from the output 20 is a one bit period. When continuous one bits are detected, the light reaching the sensor 22 in the first bit time is identical to that for a single bit event. The sense node 30 of the sensor 22 will charge to a given voltage value at the end of the first time bit. At the second time bit, however, light energy from the output 20 which is delayed will reach the photodiode 26 and produce a photocurrent that cancels the photocurrent of the first photodiode 24.

Further charging of the sense node 30 in both RZ and NRZ is prevented and the voltage is maintained at a stable value. Likewise, if both photodiodes 24 and 26 have no illumination (occurs in RZ), balance is also true and no change of voltage is seen. This charge balance approach is therefore equally effective for RZ and NRZ formats. The charge is stored in the capacitance of the sense node 30. The effect of leakage over several bit periods from the leakage of the bias resistor 40 is negligible due to its high ohmic value. At the end of a multiple 1's bit string, the light in the output 20 will illuminate the photo detector unit 22 one bit time longer than the light seen by the output 18. In this event, light from the output 20 will discharge the sense node 30 back to ground at the last bit period. The sense node 30 can therefore replicate any input multiple bit pattern. The sense node voltage will faithfully trace any input signal data pattern. In optical telecommunication systems, the run length of continuous ones are limited and will not cause leakage concerns from the bias resistor 40 which has a much longer time constant.

The load resistor of prior art receivers create Johnson noise which is inversely related to a resistor's ohmic value by the equation $I^2$ (noise)=4KT/R where K is Boltzman constant, T is the temperature and R is the resistor value. The lower the resistor value, the larger is the Johnson noise current. In contrast, the bias resistor 40 in the photo detector 22 can be several kilo-ohms in value as it is not responsible for fast discharge of the sense node 30. The bias resistor 40 only functions as a reference resistor connected to a remote bias automatic bias voltage control such as the voltage source 42 or to analog circuit ground. The automatic bias voltage control is used in applications where faster recovery to a bias voltage value is required. The automatic bias voltage control is dynamically varied to improve recovery time compared to fixed bias operation and has benefits in certain situations. Otherwise, current flow in a fixed reference bias resistor 40 is sufficient to maintain the sense node at the chosen bias point. The RC time constant of the bias resistor 40 and sense node capacitance is always much longer than the presiding data rate. Automatic bias voltage operation is an advantage at very high gigabit rates where signal energies may experience short term amplitude variations due to line attenuation variations. Such situations can exist from time to time in earth tremor prone areas or other similar environments.

Without a load resistor, the voltage signal at the sense node 30 can reach much higher amplitudes and is limited only by the parasitic capacitance value in the photodiodes 24 and 26. When light from the output 18 illuminates the first photodiode 24, the sense node 30 behaves as a true integrator. If the input light pulse in the output 18 is a square wave, the voltage at the sense node 30 is a linear rising voltage ramp. Any imbalances which occur between the charge and discharge sequences, a small residual voltage will remain on the sense node 30 but may be effectively corrected for by charge adjustments in the bias resistor 40. The optical receiver 10 uses the second photodiode as an active current sink to discharge the sense node. This has the inherent property that the discharge speed will always equal the detection speed independent of the bit rate. In addition to increased speed and higher sensitivity, the receiver 10 also has high jitter immunity, wide dynamic range and high temperature stability.

The photo detector unit 22 has an integrator function built into the sense node 30 because it is coupled to the high value bias resistor 40. As a result, the current and voltage signals are both equally strong signals that are easily sensed by an input amplifier. Voltage amplification offers the best analog signal to noise ratio in long-haul applications because it requires the fewest electrical components. Photocurrent sensing, however, has the advantage in metro applications where stronger input signals allows conversion into digital signals more efficiently. For both configurations, the receiver 10 offers higher bandwidth and lower detectability limits than standard single ended receivers.

An ideal receiver is termed a maximum-a-posteriori-probability (MAP) receiver which has the minimum probability of making an error. The MAP receiver observes a receive signal waveform completely before computing the probability of whether the signal is a one or a zero. It implicitly computes the one state probability and the zero state probability and takes the ratio of the two. If the ratio is less than one, the signal is declared as a zero bit and if it is greater, the signal is declared as a one bit. The photonic energy from a single bit is fully integrated and converted into an area value before it is compared to produce a logic value. The receiver 10 performs very close to the ideal MAP receiver. The sense node 30 allows direct integration of signals while the active discharge feature from the other photo detector permits operation in an integrate-and-dump mode, both key characteristics of the ideal MAP receiver. The end result is that the photo detector unit 22 will have a higher probability of detection and with lower bit error rates compared to current single ended receivers.

As the path delay of the light from the output 20 is shortened, cancellation of signals will occur at varying degrees for wavelengths with periods longer than the delay window. This electrical behavior is identical to a single pole high pass filter where the corner frequency is set through the delay window width. As the delay window is made smaller towards the limit of zero, the photo detector unit 22 becomes a true differentiator and passes only higher frequency information of the signal while attenuating lower frequencies. Signals with lower frequencies are effectively canceled because the relative amplitudes of such signals pre- and post-delay on the photodiodes 24 and 26 are almost identical and opposite in phase. At the limit of zero delay, all signals will cancel and no output is present at the output nodes 28 and 30.

This selection for the optimum delay is based on signal strength. By choosing an optimum delay window that is a fractional part of one bit time, logic transitions embedded inside a signal can be enhanced for the highest detection reliability. The default delay is a one bit period and will apply in the majority of field applications. In some long haul applications, the signals at a destination may be excessively contaminated by lower frequency noise. In such applications, a shorter delay between 0.4 to 1 bit period will produce better detection results. For short reach applications such as metro or central offices, a lower delay range from 0.2 to 1 bit period will be optimum. The receiver 10 may be fabricated in both fixed or variable delay package configurations as will be explained below.

With strong input signal strength, a narrow signal output from a shorter delay loop in the input 20 has value as a digital clock signal. In strong signal situations such as short reach applications, shorter delays will produce transitions at the sense node that can be amplified directly to drive logic circuits. This advantage simplifies receiver circuit design, increases channel packing density (in DWDM applications) and results in a lower cost per channel. For OC-192 at a 10 gigabit rate, the direct clock advantage permits multiple channels to share bandwidth of supporting electronics. Digital support circuits are typically designed to work much faster than the input data rate. The bandwidth of front end digital electronics may be 5 to 10 times greater than the design input data rate. It is not uncommon to have input FIFO (First In First Out) buffer registers that can operate at 60 gigabits for 10 gigabit data rates. By designing parallel processed supporting circuits around this high speed buffer memory, this FIFO component can service several input channels.

When input signal levels are low, maintaining detector response at high gigabit data rates requires reduction of the primary noise sources of shot, amplifier and Johnson noise. The reduction of Johnson noise in the IDS receiver will reduce Johnson noise by several optical dB resulting in an overall signal to noise improvement of 2 to 4 optical dB or more.

The output of the first preamplifier stage after the receiver 10 converts the optical signal is a critical test point for an eye diagram of an optical telecommunications receiver. In the receiver 10, the integration property of the sense node 30 will produce an equivalent single ended threshold optical signal but with much lower noise contribution. The output of the receiver 10 can then be sensed by either high impedance or transimpedance amplification. High impedance amplification has the lowest sense node loading but in a traditional single ended receiver, the load resistor forces such a low voltage signal that direct voltage amplification becomes impractical. The transimpedance approach amplifies and converts the sense node current into a useable voltage but has problems of Johnson noise, higher component count and feedback stability issues. With the receiver 10, the sense node 30 produces a sufficiently strong integrated signal allowing high impedance amplification. Amplifier requirements are simplified because of high impedance sensing of the receiver 10. Since the photo detector unit 22 actively charges and discharges itself using the input light signal, there is very little bandwidth penalty and no amplifier equalization is required. The direct integrator function at the sense node 30 yields a strong voltage signal that allows use of lower amplification gains.

Dynamic range is the variation of optical input powers that a receiver can tolerate and the recovery characteristics of the receiver as power levels are quickly changed. This is especially true in DWDM systems where multiple laser sources can be simultaneously transmitting and cause undesired single channel power fluctuations at receivers. The intensity of this modulated distortion (self modulated and cross modulated) will vary along a fiber span. The receiver 10 has allows common mode rejection which allows greater dynamic range. As long as the signal levels are matched on the photodiodes 24 and 26, the current at the sense node 30 will remain at zero. Any DC component in the signal will be suppressed by this common mode factor. This eliminates the need for a blocking capacitor in a conventional optical receiver and thus signal saturation. The receiver 10 can therefore function well anywhere within a fiber span from 0 dB to the end of span.

Thus the receiver 10 includes three key features. The receiver 10 offers high bandwidth at OC-192 speeds (and beyond) without facing major RC time constant issues because of the active charge-dump feature. Second, signal-to-noise is improved by several dB by eliminating the need for a low value load resistor and by signal integration at the sense node 30. This combination increases signal levels and substantially lowers Johnson noise. Using input EDFA amplification, the receiver 10 offers a sensitivity gain of 2 to 3 dB optical dB (equivalent to 4 to 6 dB electrical) or more over a single ended receiver. Third, the dynamic range is greatly improved by the common mode rejection property of the sense node 30. Weak or strong input signals can charge or discharge the sense node with equal speed, spanning a dynamic range of 0 to −40 dB for OC-48 (2.5 gigabit) data rates. Dynamic range requirement limits will vary according to SONET standards as a function of data rates.

The components of the receiver 10 may be fabricated as an integrated circuit. FIG. 6 shows a top view of a fabrication layout 100 of the receiver 10 in FIG. 1 using an active substrate for integration of components. FIG. 7 shows a side view and FIG. 8 shows a cross section view of the fabrication layout 100. Like components in FIGS. 6–8 are labeled with like element numbers as in FIG. 1. An input optical fiber 102 enters through a connector 104. The connector 104 is a standard FC, SC or similar connector that is spliced into the erbium-doped amplifier 14. The output of the erbium-doped amplifier 14 is joined by a connector 106 to an optical sensor module 108. The optical sensor module 108 contains the remaining detector circuitry such as the photo detector unit 22. The optical sensor module 108 has a substrate 110 which is fabricated from a material such as Lithium-Niobate or Indium-Phosphide which permits integration of waveguide structures along with integrated electronics at telecommunication wavelengths. However, other substrate materials may be used for other optimal wavelengths.

The input light signal into the optical sensor module 108 is first spit into two light signals along waveguide segments 112 and 114 coupled to the outputs 18 and 20 by the waveguide evanescent splitter 16. The splitter 16 will force light in the segment 114 to travel further (and therefore delayed) than the waveguide segment 112 before reaching the photo detector unit 22. At OC-192 (10 gigabits), the additional length in waveguide segment 114 is around 2 cm for a one bit delay. The outputs 18 and 20 of the evanescent splitter 16 are coupled to the two photo detectors 24 and 26 in this example which form the optical photo detector unit 22. In this example, the photo detectors 24 and 26 are InGaAs type photodiodes but other photo detectors such as Si, Si APD, InGaAs APD, Ge, Ge APD, SiGe and various III-V compounds such as GaAs and AlGaAs may be used. The output node 30 of the optical photo detector unit 22 directly inputs into amplifier electronics 116 also fabricated on the substrate 110 of the optical sensor module 108.

The two photodiodes 24 and 26 are mounted to the substrate 110 by fitting them into two deep trench micro-machined cavities or "parking spots" 118 and 120 produced by MicroElectroMechanical System ("MEMS") technology using standard reactive ion etching. This technique allows optimum detector symmetry, ensures proper alignment and has a minimum of undesired parasitic capacitances. The base material used is dependent on whether an active or passive substrate is desired. Passive substrates are made from ceramic or polymers and act like a micro-circuit board that aligns and interconnects active components. By comparison, the active substrate 110 in this example permit coexistence of electronics and optical components fabricated into one substrate. Examples of suitable active substrates are Lithium-Niobate and Indium-Phosphide, both III-V compounds well known in the art and used widely in optical telecom applications.

Each output waveguide fiber 112 and 114 terminates directly onto reverse biased photodiodes 24 and 26 respectively. Reverse biasing is achieved with the two power supplies 36 and 38, one in each arm of the photodetector 22. The preferred detector at gigabit data rates is the reverse biased PiN photodiode. The InGaAs photodiodes 24 and 26 are manufactured as die chips coated with an antireflective layer and then inserted into the special "parking spots" 118 and 120. The photodiodes 24 and 26 are inserted to allow a flush mating between the photodiode active area (antireflective coated side) and the face of the waveguide optical fibers 112 and 114. This mounting arrangement produces an optimum mating between the photodiodes 24 and 26 and the face of the waveguide fibers 112 and 114 while keeping detector mass and parasitics (excess capacitance, excess resistances and excess inductances) to a minimum. It also ensures symmetry between the two photodiodes 24 and 26 for the best match in performance. This is important to ensure equal charge-dump characteristics at gigabit speeds.

In additional to the input alignment function, the active substrate 110 also holds the evanescent splitter 16, the two photodiodes 24 and 26, the receiver preamplifier and clock recovery and digital decision circuits which are part of the amplifier circuitry 116. The input fiber 102 is coupled to the evanescent splitter 16 via a fiber waveguide 122 which is fabricated on the active substrate 110. The active substrate 110 thus permits a high degree of integration into a small footprint. Multiple receiver blocks can be fabricated next to each other to form a 1×N detector strip, a format that will match multi-channel DWDM applications well.

The active substrate 110 is mounted on a passive substrate 124. The input optical fiber 102 from the external erbium doped amplifier (EDFA) 14 is coupled to the passive substrate 124 using a micro-alignment "V-block" 126. The block 126 permits the input fiber core 102 which is around 8 um in diameter, to be aligned to the core center of the fiber waveguide 122. One method for producing the alignment block 126 is by etching a precision V-groove strip 128 into silicon, a common process used in optical telecommunications. The silicon V-groove strip 128 is then mated to a corresponding V-groove 130 etched in the passive substrate 124. The block 126 is the bonded onto the active substrate 124, capturing the optical fiber 102 in between the grooves 128 and 130.

The two photodiodes 24 and 26 are electrically connected by surface contacts consisting of micro-solder bumps that are reflowed using IR heating or vapor phase condensation, both techniques well known in the art. The completed substrate 110 is then flip-chip bonded to the passive substrate 124. This leaves a small clearance between the surface of the active substrate 110 and the surface of the passive substrate 124 for electrical isolation. The entire assembly is then mounted into an assembly package housing. Normal bond wire connections 132 are used to terminate the buffered outputs of the receiver to external I/O pins (not shown). It is standard practice to offer the I/O pins arranged as a butterfly package consisting of two straight row of pins, one extending from each side wall of the package. This receiver package is then typically mounted inside a line receiver card together with an EDFA module and other data management circuits. An input optical fiber is then connected to this line card by a self aligning connector such as an ST (for PC mount) or FC (for panel mount) connector familiar in this industry.

Alternatively, input light preamplification may also be performed using a semiconductor optical amplifier (SOA) instead of the erbium doped amplifier 14. As is well known in the art, the advantage of the SOA is small size and fabrication compatibility with III-V substrate materials. They are made with InGaAsP and can be easily integrated with other semiconductor and optical components. For certain DWDM applications where multiple channels are physically very close to each other, SOA preamplification with polarization-maintaining fibers will offer the highest packaging density. A single Indium-Phosphide substrate, for example, may hold many SOA channels.

The refractive index properties of the active substrate 110 allow fabrication of light waveguides 112 and 114 directly on its surface. The optical splitter 16 may also be fabricated with the two waveguide fibers 112 and 114 running parallel and very close to each other. As is well known in the art, by choosing the proper separation and coupling length, the input optical power into the coupler can be split into two segments at any power ratio desired. The integrated fiber waveguides 112 and 114 may be made from a variety of material combinations. Several possibilities are lighter doped GaAs over a highly doped GaAs substrate, lighter doped InP over a highly doped InP substrate, InGaAsP over an InP substrate or Ti diffused over a lithium niobate (LiNbO3) substrate. Integrated evanescent couplers can be fabricated with a loss of less than 3 dB. An alternative approach is a fused coupler similar to that manufactured by Gould that offers losses of less than 0.1 dB. The selected choice will be based on application and final package size specifications. The fused splitter technology offers the best signal to noise but is larger in size. The SOA approach has the best form factor but has more loss. For both approaches, however, the gain of the input amplifier 14 is selected to offset much of the splitter losses, where net gains are still a significant improvement over single-ended receivers.

The evanescent splitter 16 is designed to have one waveguide segment have a longer path length than the other. This additional path length is between a fractional part of one bit period to one full period depending on application. The increase in path length is produced simply by lengthening the fiber segment run on the chosen side. In the fused coupler approach, the fiber segment on the chosen side is lengthened accordingly before mating to the detector. Once set, the delay is fixed and will not change. For some special applications where it is desirable to modify the delay path length, a free-path reflective optics design is used to permit dynamic adjustments.

The output of the evanescent splitter 16 is channeled into the two waveguide fibers 112 and 114 holding fractional splits of the input optical power. The percentage of split is governed by the fiber separation within the coupling region and the refractive index in that zone. By dynamically controlling the spacing value by regulating the piezo warping of a micromachined beam, the percentage of light split can be regulated. In special ultra-high sensitivity applications such as deep sea cables, this element of control is an enabling benefit.

Figure 9:
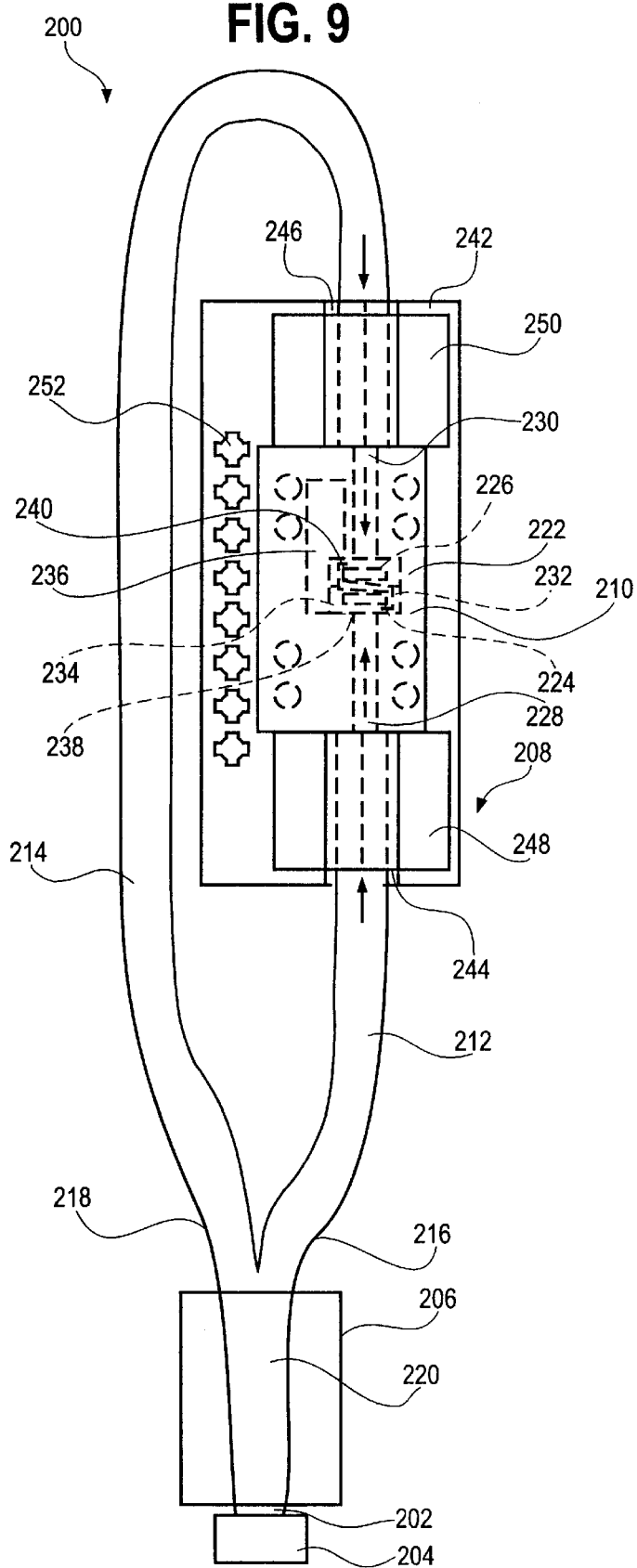
FIG. 9 is a top view of the fabrication assembly for an optical receiver using a dual fiber splitter design.

FIG. 9 shows a hybrid layout 200 of an optical receiver which is similar to the receiver 10 in FIG. 1. The hybrid layout 200 receives an optical input signal from an erbium-doped optic fiber 202 which enters the layout 200 through a connector 204. The connector 204 is a standard FC, SC or similar connector that is spliced into an erbium-doped amplifier (not shown) similar to amplifier 14 in FIG. 1. The optical signal from the erbium-doped optical fiber 202 is joined by a connector 206 to a hybrid sensor module 208. The hybrid module 208 has a substrate 210 which is fabricated from a material such as Lithium-Niobate or Indium-Phosphide permitting integration of waveguide structures along with integrated electronics at telecommunication wavelengths. However, other substrate materials may be used for other optimal wavelengths.

The input light signal into the hybrid module 208 is first spit into two light signals on fiber optic segments 212 and 214 coupled to the outputs 216 and 218 of an evanescent coupler 220. The coupler 220 will force light in the optic fiber segment 212 to travel further (and therefore delayed) than the segment 214 before reaching a photo detector unit 222. At OC-192 (10 gigabits), the additional length in optical fiber segment 212 is around 2 cm for a one bit delay. Two photodiodes 224 and 226 form the optical photo detector unit 222. In this example, the photodiodes 224 and 226 are InGaAs type photodiodes but other photo detectors such as Si, Si APD, InGaAs APD, Ge, Ge APD, SiGe and various III-V compounds such as GaAs and AlGaAs may be used. A waveguide 228 is fabricated on the substrate 210 and optically couples the segment 212 to the photodiode 224. Similarly a waveguide 230 is fabricated on the substrate 210 and optically couples the segment 214 to the photodiode 226. The photodiodes 224 and 226 are coupled to output nodes 232 and 234 which are electrically connected to amplifier and processing electronics 236 also fabricated on the substrate 210 of the hybrid module 208.

The two photodiodes 224 and 226 are mounted to the substrate 210 by fitting them into two deep trench micromachined cavities or "parking spots" 238 and 240. This technique allows optimum detector symmetry and has a minimum of undesired parasitic capacitances. The base material used is dependent on whether an active or passive substrate is desired. Passive substrates are made from ceramic or polymers and act like a micro-circuit board that aligns and interconnects active components. By comparison, active substrates permit coexistence of electronics and optical components fabricated into one substrate. Examples of suitable active substrates are Lithium-Niobate and Indium-Phosphide, both III-V compounds well known in the art and used widely in optical telecom applications.

The substrate 210 is mounted on a support ceramic base 242. The ceramic base 242 has two grooves 244 and 246 for the optic fiber segments 212 and 214 respectively. The fiber optic segments 212 and 214 are secured in the grooves 244 and 246 via alignment blocks 248 and 250. The substrate 210 is flip chip bonded to the support base 242 which also serves as an interface layer to input and output pins (not shown). The completed subassembly is sealed into a standard multi-pin butterfly housing along with DIL connectors or SMA coaxial receptacles (not shown) which are coupled via bond wires 252 to the electronics 236.

Figure 10:
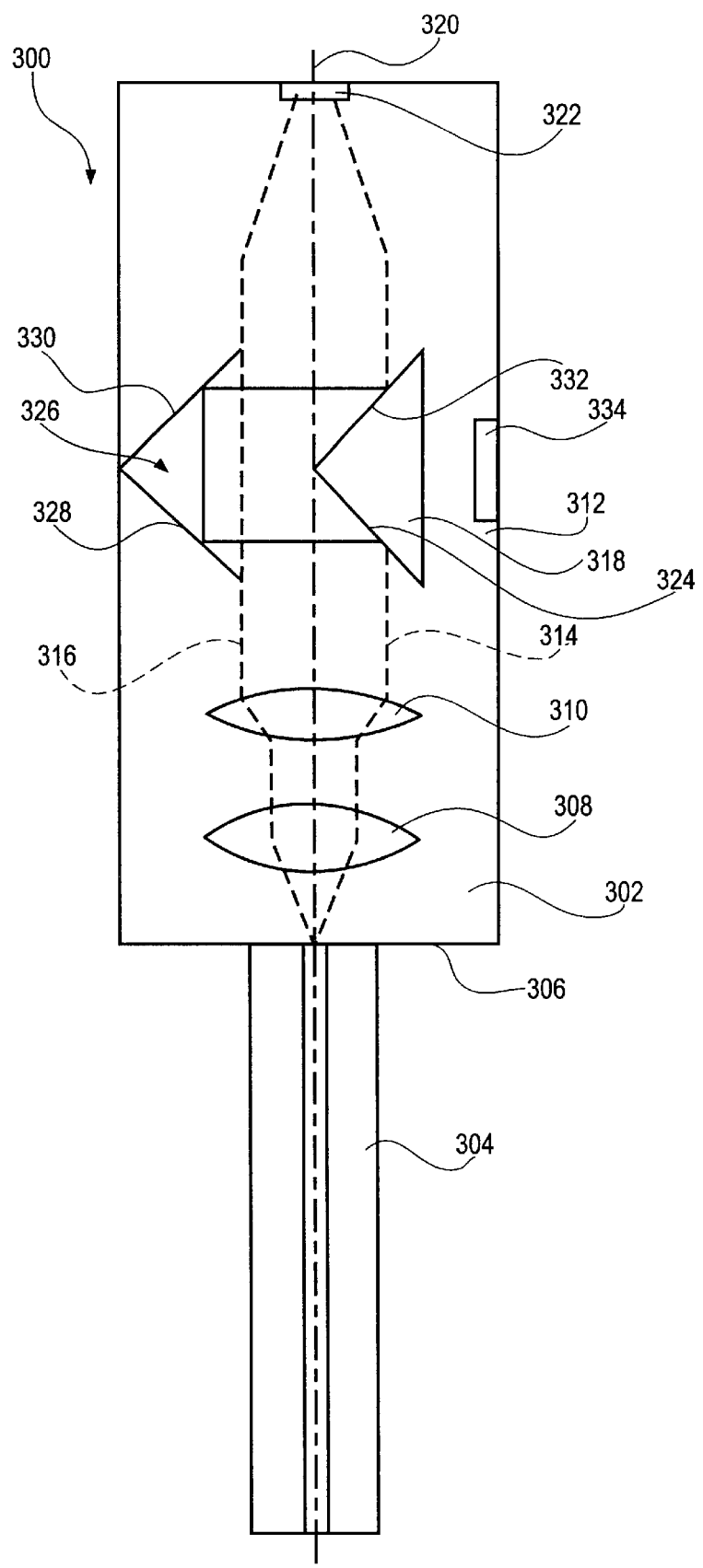
FIG. 10 is a top view of a bench mirror configuration for an optical receiver.

FIG. 10 shows another approach to the optical receiver which uses an optical bench 300 which is a free space optics system built from a combination of micro lenses and mirrors fabricated with Micromachined Electro Mechanical System technology on a single substrate 302. Light signals are input via a fiber optic cable 304. A front section 306 of the optics bench 300 has a collimator lens 308 and an astigmatic lens 310. As the light exits the astigmatic lens 310, it becomes elongated in cross-section before it enters a knife edge beam splitter 312. The knife edge aperture 312 splits the beam into two equal components 314 and 316. The first component 314 is diverted into a corner roof mirror reflector 318 while the second component 316 will pass straight through. The first component 314 diverted is forced to travel a longer path before it is recombined with the second component 316. The increase in the first component path length is designed to be less than or equal to one bit length. By controlling the height of the corner roof mirror reflector 318, various path delays can be achieved. The beams are finally refocused onto a sensor 320 with two detector elements similar to the photo detector 22 in FIG. 1 with a micro lens 322.

Differential optical detection is achieved by sensing the delayed component 314 through the knife aperture 312 with one detector element while the undelayed component 316 is sensed by the second matched detector element. The two detector elements of the sensor 320 are located adjacent to each other and electrically connected in a parallel but inverse polarity manner. Each element can take the form of mating half circles or mating rectangles.

The collimating lens 310 converts the diverging light output of the fiber 304 into a collimated beam and elongated along the vertical axis by the micro astigmatic lens 308. By converted to an oval light beam cross-section, this optical configuration more efficiently splits into two components. The smaller beam width produces less diffraction points along the knife aperture line and results in lower diffraction losses.

When the signal light beam reaches the splitting knife aperture 312, the segment 316 passes through the bench 300 unobstructed. The segment 314 reflects off a first bottom mirror 324 at a 90 degree angle towards an upper corner reflector 326. The upper corner reflector 326 has two right angle mirrors 328 and 330. Light from the bottom mirror 324 is reflected off the first corner mirror 328 and then off the second corner mirror 330 for a full 180 degree path change. The light continues and reflects off a second corner mirror 332 of the corner reflector 318 at 90 degrees to return it again on a parallel path with second light segment. The four right angle mirrors 324, 328, 330 and 332 perform a periscope effect to force a longer path length travel for the light segment 316. By varying the height of the roof corner reflector 318, the path length delay for the light segment may be modified in real-time. The height may be controlled using a piezo electric actuator 334. This is useful in long haul applications where a differential delay may be tuned to lock onto an optimum signal to noise ratio. The delayed light segment 314 after multiple reflections in the knife aperture 312 will be lagging in phase compared to the other segment 316 of the optical signal.

The unobstructed beam segment 314 and the delayed beam segment 316, when recombined, are then focused onto a focal detector plane such as the lens 322. The focused image will still be an elongated shape, but with distinct separation between the first and second components of the signal beam. The two light signal segments are then detected by the two detectors of the sensor 320. As previously described, the voltage-phase output of the optical sensor 320 is detected by an appropriate preamplifier and receiver logic block (not shown). By using free space mirror optics in the bench 300, losses from splitting are minimized and results in better performance than the active substrate approach.

Similar to the active substrate light waveguide optical bench 100 in FIG. 6, the input optic fiber 304 in the free space design is also aligned by V-groove blocks. One example of current art is cited by Tabasky et el. (U.S. Pat. No. 5,436,996). Another key feature of the free space optical bench is linear scale ability. Multiple receiver channels can be cascaded as a linear array sharing optical surfaces. This is significant in DWDM applications where multiple channels are physically close to each other and scaling benefits in linear formats can greatly increase channel packing density.

It will be apparent to those skilled in the art that various modifications and variations can be made in the method and system of the present invention without departing from the spirit or scope of the invention. The present invention is not limited by the foregoing descriptions but is intended to cover all modifications and variations that come within the scope of the spirit of the invention and the claims that follow.

What is claimed is:

1. An optical signal receiver for reception of an optical signal and conversion of that signal to an electrical signal, the receiver comprising:
   an optical amplifier capable of receiving the optical signal;
   an optical splitter optically coupled to the optical amplifier and having two optical outputs;
   an optical sensor coupled to the optical splitter, the optical sensor having:
   a first output terminal;
   a second output terminal;
   a first photo detector which produces an electrical signal in response to a light input, coupled between the first and second output terminals, the first photo detector element being optically coupled to the first output of the optical splitter; and
   a second photo detector which produces an electrical signal in response to a light input, coupled between the first and second output terminals and in parallel with the first photo detector, the second photo detector element being optically coupled to the second output of the optical splitter, wherein the signal from the second output of the optical splitter is delayed relative to the signal from the first output; and wherein the electrical signal of the second photo detector is opposite in polarity to that of the electrical signal of the first photo detector canceling out at least some of first signal.

2. The receiver of claim 1 wherein the first and second photo detectors are PiN type photodiodes.

3. The receiver of claim 2 wherein the first and second photodiodes are Indium Gallium Arsenide.

4. The receiver of claim 1 wherein the optical sensor further includes a first voltage source coupled in series with the first photo detector and a second voltage source coupled in series with the second photo detector.

5. The receiver of claim 4 wherein the first and second voltage sources are transformer isolated DC power supplies.

6. The receiver of claim 4 wherein the first and second voltage sources are photovoltaic elements and the receiver further includes a light source coupled to the photovoltaic element to produce a selected voltage output.

7. The receiver of claim 1 further comprising:
a resistor coupled to the first output terminal;
a bias power source coupled to the resistor; and
wherein the second output terminal is grounded.

8. The receiver of claim 1 wherein the optical amplifier is an erbium doped fiber amplifier.

9. The receiver of claim 1 wherein the optical amplifier is a semiconductor optical amplifier.

10. The receiver of claim 1 wherein the light signals on the light input represent bits of data and the second output is delayed by one bit length.

11. The receiver of claim 1 wherein the optical splitter is an evanescent coupler.

12. The receiver of claim 1 wherein the optical splitter includes:
a substrate;
a collimator lens optically coupled to the optical signal;
an astigmatic lens optically coupled to the collimator lens;
a knife edge beam splitter which splits the optical signal into two signals on the first and second outputs;
a micro lens optically coupled to the first and second outputs;
a corner reflector optically coupled to the second output which elongates the path of one of the light signals.

13. The receiver of claim 12 further comprising an actuator coupled to the corner reflector to vary the path of one of the light signals.

14. The receiver of claim 1 wherein the optical sensor is fabricated on an active substrate.

15. The receiver of claim 14 wherein the substrate is lithium-niobate.

16. The receiver of claim 14 wherein the substrate is indium-phosphide.

17. The receiver of claim 14 further comprising:
a first waveguide fabricated on the substrate which optically couples the first output terminal to the first photo detector;
a second waveguide fabricated on the substrate which optically couples the second output terminal to the second photo detector, the second waveguide being less than or equal to a bit length longer than the first waveguide; and
wherein the splitter is fabricated on the substrate.

18. The receiver of claim 14 wherein the outputs of the detectors are coupled to amplifier electronics fabricated on the substrate.

19. A method of receiving an optical signal and converting the signal to an electrical signal, the method comprising:
amplifying the light signal;
splitting the light signal into a first and second segment;
delaying the first segment;
converting the delayed first segment of the light signal using a first photo detector into a first electrical signal and converting the second segment of the light signal using a second photo detector into a second electrical signal;
wherein the second photo detector is coupled in parallel with the first photo detector and the second electrical signal is opposite in polarity from the first electrical signal;
measuring the second electrical signal to generate an electrical signal representative of the optical signal; and
combining the second electrical signal with the first electrical signal through the outputs of the first and second photo detectors to nullify at least part of the second electrical signal to allow further detection of additional light signals.

20. The method of claim 19 further comprising:
reverse biasing the electrical signal representing the first segment by connecting a power supply; and
reverse biasing the electrical signal representing the second segment by connecting a second power supply.

21. The method of claim 19 further comprising adding a resistor and a voltage source to the electrical output.

22. The method of claim 19 further comprising selecting a delay for the first input signal for optimal detection of the optical signal.

23. An optical receiver for converting an amplified optical signal on an optical fiber to an electrical signal, the receiver comprising:
an optical connector connected to the optical fiber; a passive substrate;
an active substrate mounted on the passive substrate;
a splitter fabricated on the active substrate and coupled to the optical connector, the splitter having two outputs for splitting the optical signal;
a first and second waveguide coupled to the two outputs of the splitter respectively, the first waveguide being longer than the second waveguide;
a first photo detector optically coupled to the first waveguide, having an anode and a cathode;
a second photo detector optically coupled to the second waveguide, having a cathode coupled to the anode of the first photo detector and an anode coupled to the cathode of the first photo detector; and
an output node coupled to the anode of the first photo detector and the cathode of the second photo detector.

24. The receiver of claim 23 wherein the photo detectors are PiN photodiodes.

25. The receiver of claim 24 wherein the photodiodes are InGaAs photodiodes.

26. The receiver of claim 23 wherein the passive substrate is silicon and the active substrate is indium phosphide.

27. The receiver of claim 23 wherein amplifier electronics are fabricated on the active substrate.

28. The receiver of claim 23 wherein the first and second photo detectors are die chips mounted in trench cavities formed in the active substrate.

29. The receiver of claim 23 further comprising:
a first photovoltaic element coupled in series with the first photo detector;
a second photovoltaic element coupled in series with the second photo detector; and a light source coupled to photovoltaic elements to produce a selected voltage output.

30. The receiver of claim 29 further comprising:
an alignment block with a groove which aligns the optical fiber; and
wherein the passive substrate further includes a corresponding groove and the optical fiber is located between the groove of the alignment block and the groove in the passive substrate.

31. An optical signal receiver for reception of an optical signal and conversion of that signal to an electrical signal, the receiver comprising:

an optical splitter for receiving the optical signal, the splitter having two optical outputs;

an optical sensor coupled to the optical splitter, the optical sensor having:

a first output terminal;

a second output terminal;

a first photo detector which produces an electrical signal in response to a light input, coupled between the first and second output terminals, the first photo detector element being optically coupled to the first output of the optical splitter;

a second photo detector which produces an electrical signal in response to a light input, coupled between the first and second output terminals and in parallel with the first photo detector, the second photo detector element being optically coupled to the second output of the optical amplifier, wherein the signal from the second output of the optical splitter is delayed relative to the signal from the first output; and a load element coupled in series to a bias voltage source from the first output terminal to a ground point allowing the first and second output terminals to float relative to the ground point.

* * * * *